United States Patent
Dwyer et al.

(10) Patent No.: US 9,398,741 B2
(45) Date of Patent: Jul. 26, 2016

(54) PTO CONTROL SYSTEM

(71) Applicant: Husqvarna AB, Huskvarna (SE)

(72) Inventors: Sean Dwyer, Gastonia, NC (US); Juan Rodriguez, Lexington, SC (US); Matthew Albinger, Shelby, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/433,465

(22) PCT Filed: Oct. 4, 2012

(86) PCT No.: PCT/US2012/058609
§ 371 (c)(1),
(2) Date: Apr. 3, 2015

(87) PCT Pub. No.: WO2014/055075
PCT Pub. Date: Apr. 10, 2014

(65) Prior Publication Data
US 2015/0257336 A1    Sep. 17, 2015

(51) Int. Cl.
| | |
|---|---|
| B60K 17/28 | (2006.01) |
| A01D 34/76 | (2006.01) |
| A01D 34/64 | (2006.01) |
| B60K 25/00 | (2006.01) |

(Continued)

(52) U.S. Cl.
CPC ............... *A01D 34/76* (2013.01); *A01D 34/64* (2013.01); *A01D 69/08* (2013.01); *B60K 25/00* (2013.01); *G05G 5/05* (2013.01); *H01H 3/46* (2013.01); *H01H 13/52* (2013.01); *H01H 15/24* (2013.01); *H01H 2205/002* (2013.01); *H01H 2231/052* (2013.01); *H01H 2235/01* (2013.01)

(58) Field of Classification Search
CPC ........ B60K 17/28; B60K 25/00; B60K 25/08; B60W 26/00; A01D 34/00

USPC ................................... 701/50; 180/53.1, 53.6
See application file for complete search history.

(56) References Cited

U.S. PATENT DOCUMENTS

| | | |
|---|---|---|
| 2,423,387 A | 7/1947 | Johnson |
| 5,408,058 A | 4/1995 | Homik et al. |

(Continued)

FOREIGN PATENT DOCUMENTS

EP    1389556 A1    2/2004

OTHER PUBLICATIONS

John Deere, "Product Manuals", http://manuals.deere.com/cceomview/OMM144042_D0/Output/OMM144042_D05.html.

(Continued)

*Primary Examiner* — Tan Q Nguyen
(74) *Attorney, Agent, or Firm* — Nelson Mullins Riley & Scarborough LLP

(57) ABSTRACT

A lawn care device may include a cutting deck housing at least one blade, an engine configured to selectively provide for rotation of the at least one blade responsive to selective coupling of the rotary power of the engine to the at least one blade via a power takeoff (PTO) clutch, and a PTO switch that is operable in two directions to engage or disengage the PTO clutch based on which one of the two directions the PTO switch is moved by a user. The PTO switch may be biased to return to a neutral position after each operation thereof. The PTO switch may be configured to perform at least one additional operational function responsive to sequential operation of the PTO switch in at least one of the two directions.

20 Claims, 7 Drawing Sheets

(51) Int. Cl.
*G05G 5/05* (2006.01)
*H01H 3/46* (2006.01)
*H01H 13/52* (2006.01)
*H01H 15/24* (2006.01)
*A01D 69/08* (2006.01)
*B60W 20/00* (2016.01)

(56) References Cited

U.S. PATENT DOCUMENTS

| | | | |
|---|---|---|---|
| 5,570,754 A | 11/1996 | Stimson | |
| 5,592,029 A | 1/1997 | Hollstein et al. | |
| 5,994,857 A | 11/1999 | Peterson et al. | |
| 6,109,010 A * | 8/2000 | Heal | B60K 28/10 56/10.5 |
| 7,172,041 B2 | 2/2007 | Wuertz et al. | |
| 7,224,088 B2 | 5/2007 | Shoemaker et al. | |
| 7,891,448 B2 | 2/2011 | Onderko et al. | |
| 8,195,366 B2 | 6/2012 | McCabe et al. | |
| 2004/0201286 A1 * | 10/2004 | Harvey | A01D 34/828 307/326 |
| 2005/0274098 A1 | 12/2005 | Weber et al. | |
| 2006/0042212 A1 * | 3/2006 | Shoemaker | A01D 34/828 56/10.2 R |
| 2009/0065273 A1 | 3/2009 | Wyatt et al. | |
| 2010/0331142 A1 * | 12/2010 | Mizoguchi | B60K 25/00 477/111 |
| 2011/0172892 A1 * | 7/2011 | Matsuzaki | B60R 16/08 701/58 |
| 2012/0061158 A1 | 3/2012 | Gotou | |

OTHER PUBLICATIONS

International Search Report and Written Opinion of PCT/US2012/058609 mailed on Dec. 26, 2012.
Chapter I of the International Preliminary Report on Patentability of PCT/US2012/058609 issued on Apr. 7, 2015.

* cited by examiner

PTO CONTROL SYSTEM

TECHNICAL FIELD

Example embodiments generally relate to outdoor power equipment and, more particularly, some embodiments relate to a power takeoff (PTO) control system for a lawn care vehicle.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

The cutting blades employed by lawn mowers are typically rotated in some fashion in order to cause the rotating blade to cut vegetation that is encountered thereby. One way to cause rotation of the cutting blade of a lawn mower is to use electricity to engage a clutch to the main engine crankshaft of the lawn mower. In some cases, such a clutch may be referred to as a power takeoff (PTO) clutch. The PTO clutch may transfer rotational torque and power to activate rotating components like the blades on lawn mowers. For an electrically operated clutch, a magnetic armature and rotor may be operable based on electricity supplied from a battery of the mower to engage a clutch and plate to allow full contact and thereby rotate the blades. A similar mechanism may also be employed for tillers or other outdoor power equipment that utilizes rotatable working gear to accomplish a task.

In many devices in which a PTO clutch is employed, a switch is provided in an accessible location for the operator to engage or disengage. Such a switch is often provided as a mechanically robust switch that may require considerable effort to engage/disengage. Furthermore, the devices may provide certain interlocks to prevent certain undesirable activities in dependence upon the position of the switch. The difficulty of operation, coupled with the sometimes unexpected operation of certain interlocks, can be distracting or even upsetting to some operators.

BRIEF SUMMARY OF SOME EXAMPLES

Some example embodiments may provide a control system for employment, for example, with a two way momentary switch for use in conjunction with an electronic logic system or relay system to allow the PTO clutch to be engaged or disengaged while the switch returns to a neutral position.

Some example embodiments may improve the ability of operators to operate outdoor power equipment such as riding lawn mowers or tillers that employ a PTO to engage and disengage a PTO clutch and also perform at least one additional operation such as mowing in reverse. Operators may therefore take fuller advantage of the capabilities of their outdoor power equipment devices, and have a greater satisfaction with the performance of their outdoor power equipment devices.

In an example embodiment, a lawn care device is provided. The lawn care device may include a cutting deck housing at least one blade, an engine configured to selectively provide for rotation of the at least one blade responsive to selective coupling of the rotary power of the engine to the at least one blade via a power takeoff (PTO) clutch, and a PTO switch that is operable in two directions to engage or disengage the PTO clutch based on which one of the two directions the PTO switch is moved by a user. The PTO switch may be biased to return to a neutral position after each operation thereof. The PTO switch may be configured to perform at least one additional operational function responsive to sequential operation of the PTO switch in at least one of the two directions.

In another example embodiment, a PTO switch may be provided. The PTO switch may control selective coupling of rotary power from an engine of a lawn care device to a cutting blade of the lawn care device via a PTO clutch. The PTO switch may include a cap portion graspable by a user of the lawn care vehicle, a shaft having the cap portion disposed proximate to one end thereof and extending into the lawn care device, and a contact plate. The shaft may be operable in two directions and the contact plate may be disposed proximate to an opposite end of the shaft to make electrical contact with one of at least two contacts responsive to movement of the shaft. The at least two contacts may correspond to an engagement contact and a disengagement contact. The electrical contact between the contact plate and the engagement contact may engage the PTO clutch and electrical contact between the contact plate and the disengagement contact may disengage the PTO clutch. The shaft may be biased to return to a neutral position after each operation of the PTO switch. In some cases, sequential electrical contacts between the engagement contact and the contact plate may cause at least one additional operational function of the lawn care device to be performed.

In another example embodiment, a method of enabling controlling operation of a lawn care device having a cutting deck that houses at least one blade and an engine configured to selectively provide for rotation of the at least one blade responsive to selective coupling of rotary power of the engine to the at least one blade via a power takeoff (PTO) clutch is provided. The method may include providing a PTO switch that is operable in two directions to engage or disengage the PTO clutch based on which one of the two directions the PTO switch is moved by a user. The PTO switch may be biased to return to a neutral position after each operation thereof. The method may further include providing a processor configured to receive inputs indicative of movement of the PTO switch in either of the two directions, utilizing the processor to provide control of the PTO clutch based on the movement of the PTO switch, and utilizing the processor to control performance of at least one additional operational function responsive to sequential operation of the PTO switch in at least one of the two directions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
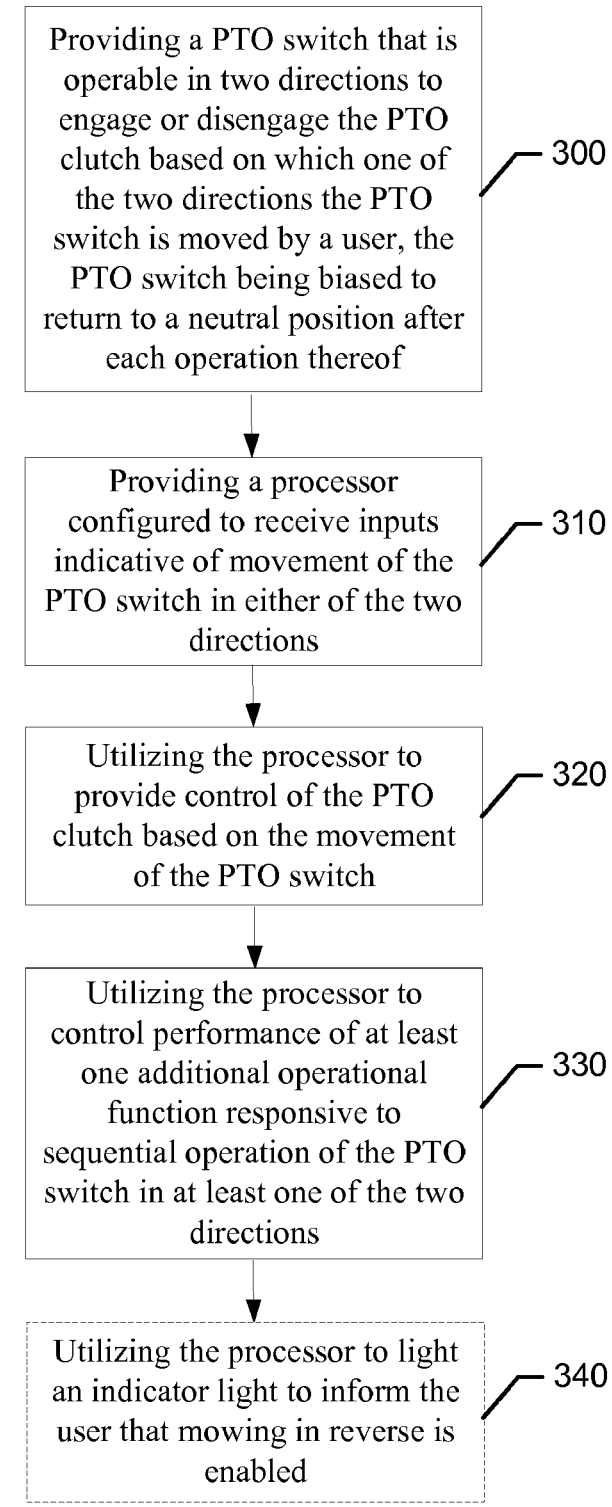
Figure 5A:
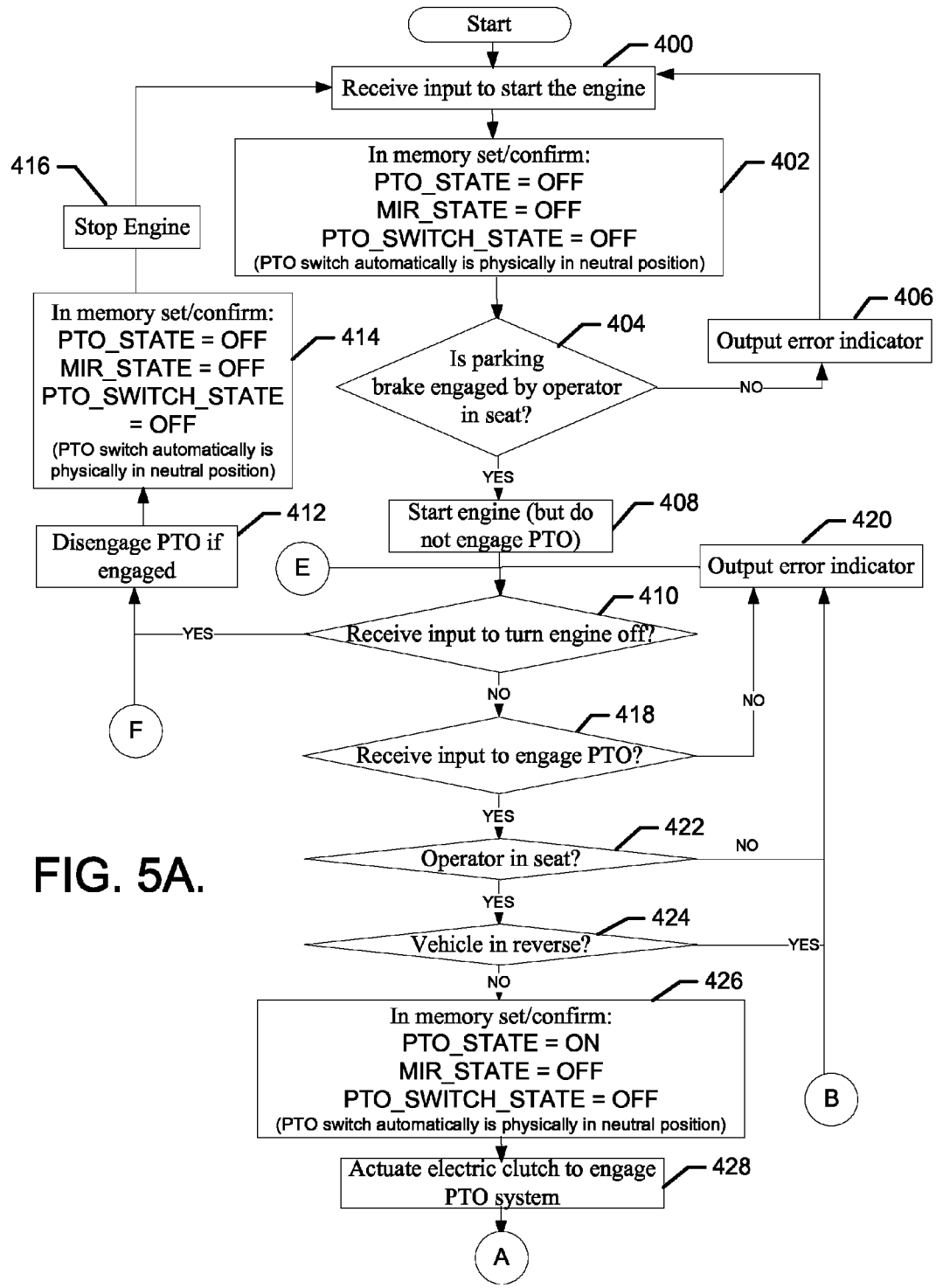
Figure 5B:
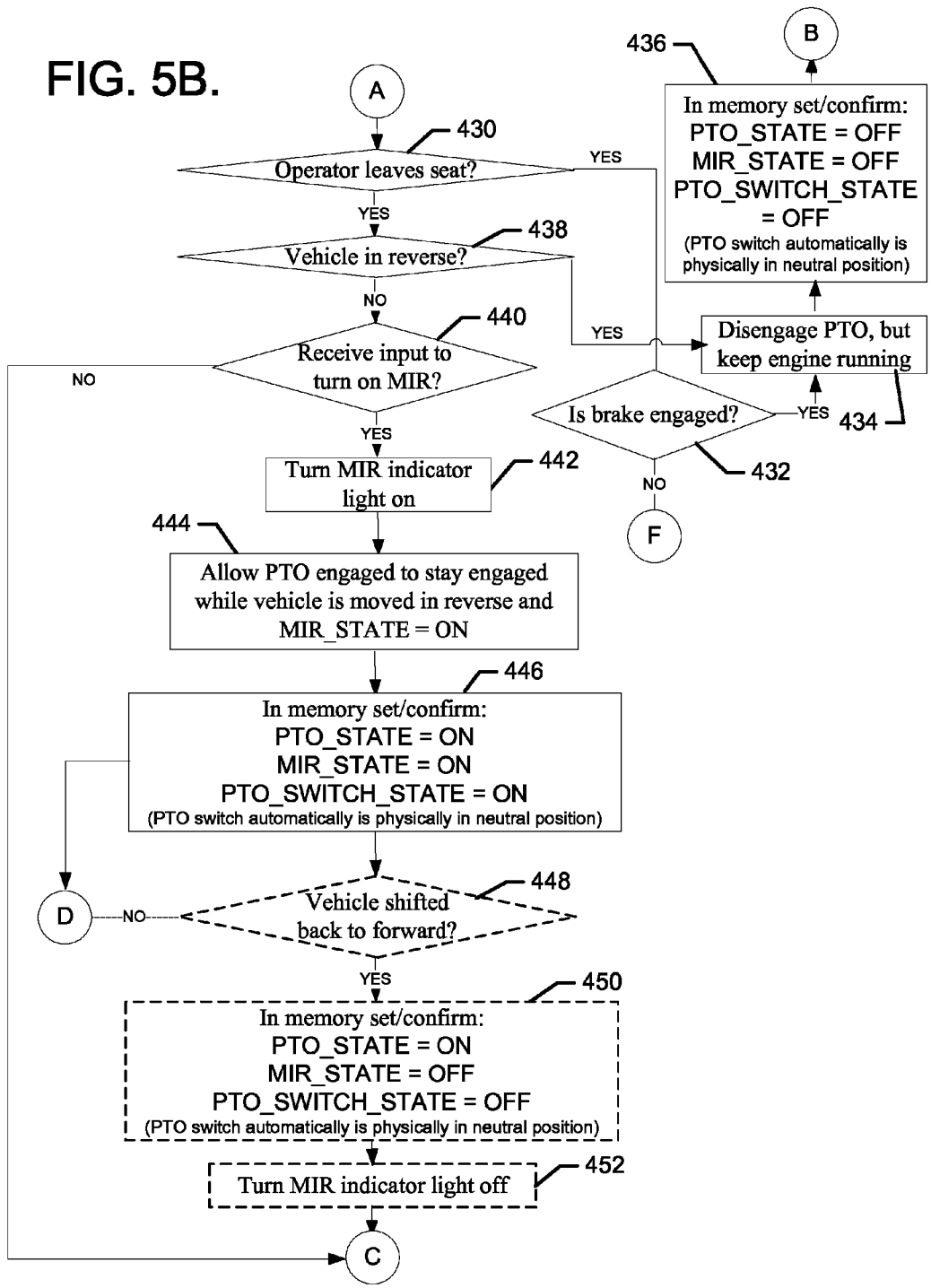
Figure 5C:
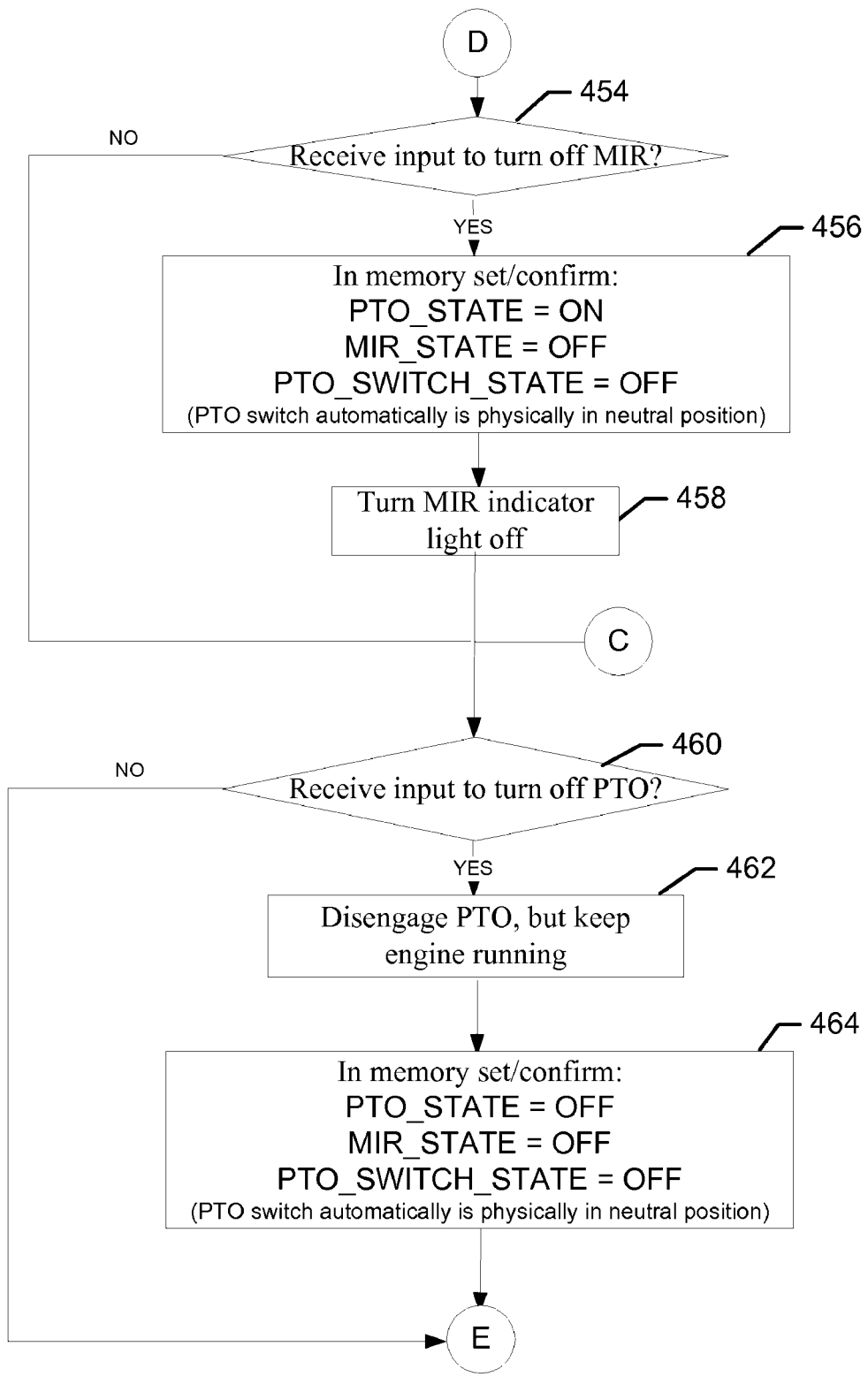

FIG. 4 illustrates a block diagram of a method of enabling controlling operation of a lawn care device having a cutting deck that houses at least one blade and an engine configured to selectively provide for rotation of the at least one blade responsive to selective coupling of rotary power of the engine to the at least one blade via a power takeoff (PTO) clutch according to an example embodiment; and FIG. 5, which includes FIGS. 5A, 5B, and 5C, provides a flow chart showing operation of a control algorithm according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

Some conventional riding lawn mowers employ PTO switches that are mechanically operable and therefore are maintained in the last position that the operator places them in until they are manually repositioned. Such a reliance on manual repositioning may lead to interruptions or distractions relative to the user experience since certain interlocks regarding operation of the riding lawn mowers may be triggered based on the operator forgetting that the PTO switch was last left in a position that will trigger an interlock.

In an example embodiment, a lawn mower is provided that may avoid triggering some of those interlocks inadvertently. In this regard, some example embodiments may provide a two-way, momentary PTO switch. The momentary nature of the switch may reduce the likelihood of one of the various interlocks that may otherwise be triggered interfering with the user experience. By virtue of the momentary nature of the switch, prior entries may essentially be cleared or reset after shutdown so that proper startup conditions are provided each time after a shutdown without the need for additional operator intervention. In some cases, the automatic return of the PTO switch to a neutral position may also enable the user to carry out additional functional operations using the PTO switch that may not be possible with conventional mechanically operated switches. The operator experience may therefore be improved with respect to operation of riding lawn care vehicles on which the PTO switch is employed.

Figure 1:
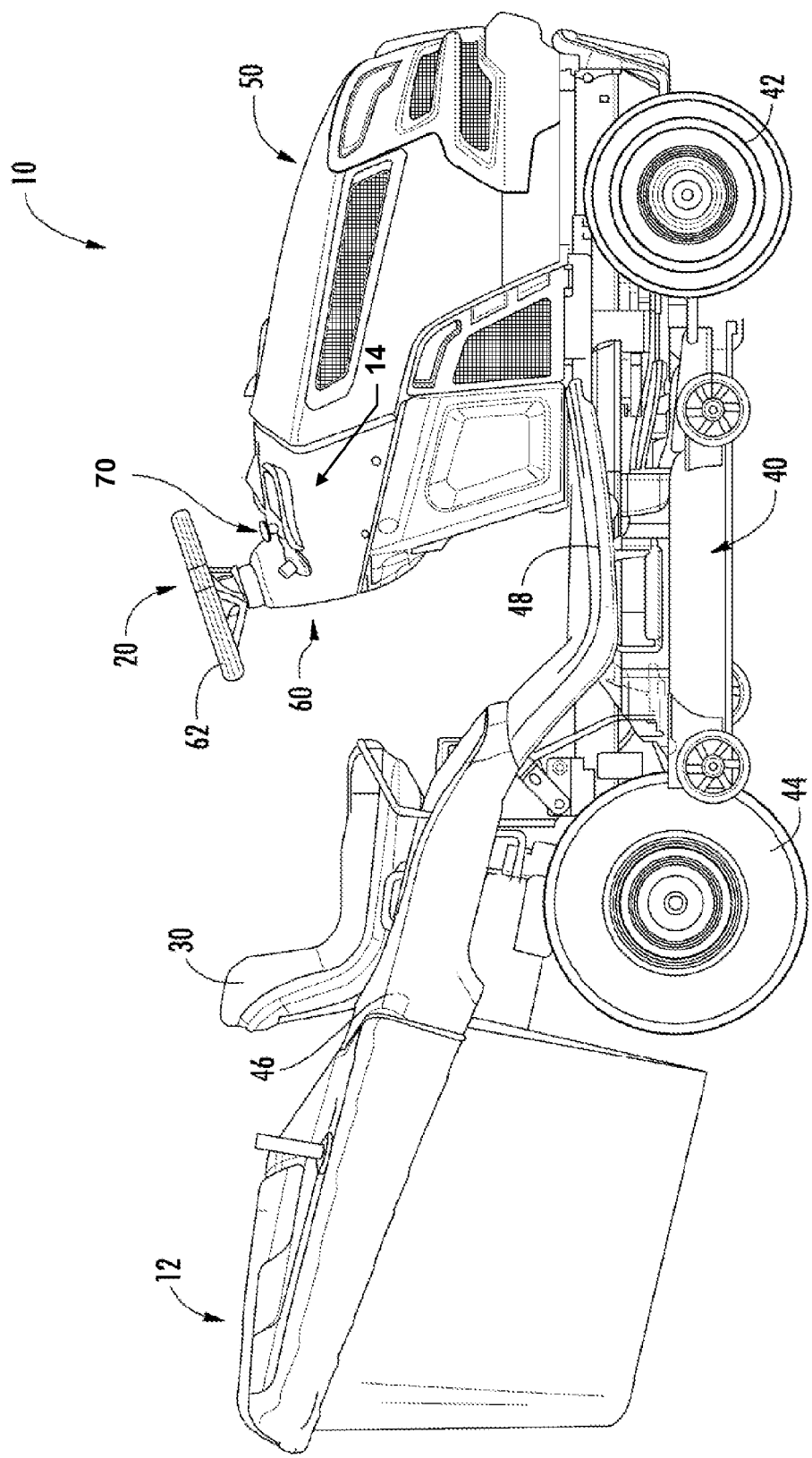
FIG. 1 illustrates a perspective view of the riding lawn care vehicle according to an example embodiment.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays and/or the like. As shown and described herein, the riding lawn care vehicle 10 may be a riding lawn mower (e.g., a lawn tractor, front-mount riding lawn mower, zero-turn riding lawn mower, cross mower, stand-on riding lawn mower, and/or the like). However, other example embodiments may be employed on other outdoor power equipment devices, such as walk behind lawn mowers, tillers, snow throwers, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments the shafts are coupled to a motor via a system of belts and pulleys. In other embodiments the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass). When the PTO clutch is disengaged, rotary power generated by the engine 50 may not be coupled to the one or more cutting blades and thus the cutting blades may not rotate. In some embodiments, engagement of the PTO clutch may be accomplished via operation of a PTO switch 70 that may be disposed on or proximate to the operations panel 14.

Figure 2:
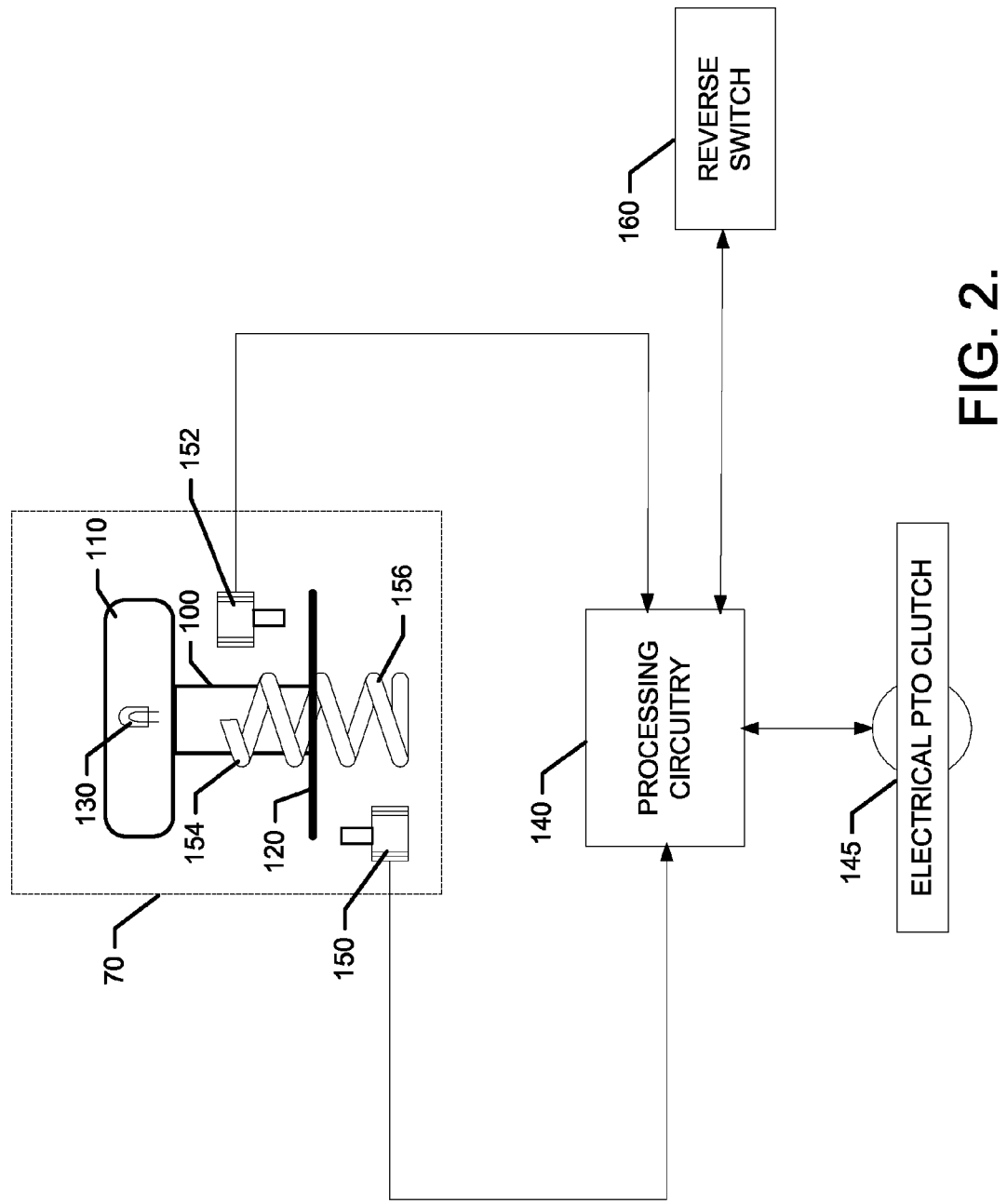
FIG. 2 illustrates a functional block diagram for explaining the operation of a PTO switch of the riding lawn care vehicle of an example embodiment.

FIG. 2 illustrates a functional block diagram for explaining the operation of the PTO switch 70 of an example embodiment. As shown in FIG. 2, the PTO switch 70 may include a switch body including a shaft 100 and a cap 110. The shaft 100 may be substantially cylindrical in shape (although other shapes could be employed) and may extend out of a covering placed over the operations panel 14 between the cap 110 and a contact plate 120. The shaft 100 of some embodiments may be made of plastic, a molded composite, metal and/or the like. The cap 110 may be made of similar or different material to that of the shaft 100 and may be engaged to the shaft 100 by any fixation method (e.g., weld, screw, nut/bolt combination, rivet, snap fit, etc.) or by being part of the same unitary piece of material. In some embodiments, the cap 110 may be a plate shaped piece of material that has a larger diameter than the shaft 100 to facilitate grasping of the cap 110 by an operator of the riding lawn care vehicle 10.

In some embodiments, a portion of the cap 110 or the shaft 100 may house one or more indicator lights (e.g., indicator light 130). Lights such as the indicator light 130 may be used to provide indications related to a state of the PTO switch 70 or a state of certain functional situations impacted by the current or most recent position or positioning of the PTO switch 70. In some cases, the indicator light 130 may be a backlight for illuminating a predefined text message or icon associated with providing a specified informational message or alert to the operator. The message or icon may be indicative of whether a particular mode (e.g. mow in reverse mode) of operation is enabled. Thus, for example, if the light is lit, mow in reverse may be enabled, but mow in reverse functionality may be disabled if the light is not lit.

In an example embodiment, the indicator light 130 may receive its input (e.g., electrical power to turn the light on or off) based on positions of one or more switches, relays or contacts that indicate corresponding conditions or situations. The input may be associated with a most recent contact made by the contact plate 120. Alternatively or additionally, the indicator light 130 may receive its input from processing circuitry 140. In an embodiment employing the processing circuitry 140, the processing circuitry 140 may also function to translate switch inputs into corresponding outputs of an electrical PTO clutch 145 as described in greater detail below.

The contact plate 120 may be provided to close an indicator circuit, operate a relay or otherwise activate a switching component responsive to the contact plate 120 being in electrical contact with a corresponding contact (e.g., disengagement contact 150 or engagement contact 152) based on a position of the PTO switch 70. In an example embodiment, when the PTO switch 70 is depressed or pushed in a predefined amount, the contact plate 120 may come into contact with the disengagement contact 150 and a corresponding signal indicative of the event may be communicated to the processing circuitry 140. Meanwhile, if the PTO switch 70 is pulled out a predefined amount, the contact plate 120 may come into contact with the engagement contact 152 and a corresponding signal indicative of the event may be communicated to the processing circuitry 140.

Responsive to receipt of a signal indicative of the contact plate 120 making electrical contact with the disengagement contact 150, the processing circuitry 140 may take actions associated with PTO clutch disengagement as described herein. Meanwhile, responsive to receipt of a signal indicative of the contact plate 120 making electrical contact with the engagement contact 152, the processing circuitry 140 may take actions associated with PTO clutch engagement as described herein.

In an example embodiment, the PTO switch 70 may be a momentary switch insofar as the PTO switch 70 may be biased to return to a neutral position after any actuation relative to engagement or disengagement of the PTO. In other words, responsive to any movement of the contact plate 120 causing the contact plate 120 to make electrical contact with the disengagement contact 150 or the engagement contact 152 based on manual lifting or depressing of the cap 110 by the operator, the contact plate 120 will be returned to a neutral position where there is no further contact with either the disengagement contact 150 or the engagement contact 152 after the operator releases the PTO switch 70. In an example embodiment, one or more springs (e.g., springs 154 and 156) may be disposed proximate to the shaft 100 and/or the contact plate 120 to oppose movement of the contact plate 120 toward either the disengagement contact 150 or the engagement contact 152, and restore the contact plate 120 to the neutral position responsive to any movement away from the neutral position. As such, the PTO switch 70 may be biased to remain in and return to the neutral position.

As indicated above, the processing circuitry 140 may communicate with the electrical PTO clutch 145 based on operation of the PTO switch 70. In an example embodiment, the processing circuitry 140 may be configured to translate switch inputs (e.g., based on the contacting of the contact plate 120 with the disengagement contact 150 or the engagement contact 152) into corresponding outputs to cause engagement or disengagement of the electrical PTO clutch 145. The electrical PTO clutch 145 may selectively couple rotation of the engine to the cutting blades. In other words, for example, the electrical PTO clutch 145 may provide controls to couple the rotary power generated by the engine 50 to the one or more cutting blades in the cutting deck 40 to cause rotation of the one or more cutting blades when the electrical PTO clutch 145 receives an engage signal from the processing circuitry 140. The processing circuitry 140 may provide the engage signal responsive to an indication that the PTO switch 70 has been pulled out (e.g., to contact the engagement contact 152).

Meanwhile, when the electrical PTO clutch 145 is disengaged (e.g., via the PTO switch 70 being depressed or pushed in so that the disengagement contact 150 is contacted), a disengage signal may be generated by the processing circuitry 140 and the processing circuitry 140 may communicate the disengage signal to the electrical PTO clutch 145. The electrical PTO clutch 145 may then, responsive to receipt of the disengage signal, cause rotary power generated by the engine 50 to be decoupled from the one or more cutting blades and thus the cutting blades may not rotate. After operation of the PTO switch 70 to either engage or disengage the electrical PTO clutch 145, the PTO switch 70 may be returned to a neutral position. In other words, the contact condition between the contact plate 120 and either of the disengagement contact 150 or the engagement contact 152 may be cleared. However, the signal provided by the processing circuitry 140 may ensure that the electrical PTO clutch 145 remains in the operating condition in which it was last sent by operation of the PTO switch 70 until some other condition overrides.

By providing for immediate return of the PTO switch 70 to the neutral position, preexisting or previous PTO switch 70 positions will not be carried over to affect future operations of the system when an intervening action is performed. For example, in a conventional PTO switch that does not return to the neutral position, engagement of the PTO switch by pulling the PTO switch outward may cause the PTO clutch to engage. However, mechanical/safety interlocks in the system may prevent starting of the mower while the PTO switch remains in the outward position. Accordingly, if the operator leaves the PTO switch pulled out and stops the mower, the PTO switch will remain in the pulled out condition when the user next attempts to start the mower. The mower may be prevented from starting. In some cases, a start fault indicator may inform the user to disengage the PTO switch. However, this may create a situation that interferes with the user's enjoyment of the user experience.

Meanwhile, example embodiments may enable the riding lawn care vehicle 10 to be started even if the user forgets to manually disengage the PTO switch 70. In this regard, for example, the use of the PTO switch 70 to engage the electrical PTO clutch 145, while the PTO switch 70 is biased to return to a neutral position after the contact plate 120 makes contact with the engagement contact 152, may ensure that the electrical PTO clutch 145 does not remain engaged after the riding lawn care vehicle 10 is shut down. Instead, when the riding lawn care vehicle 10 is powered down or turned off, the electrical components may return to a rest state or otherwise de-energize. Thus, for example, the electrical PTO clutch 145 may disengage so that rotary power of the engine 50 is not coupled to the cutting blades. Since the PTO switch 70 is in the neutral position by default, when the user attempts to start the riding lawn care vehicle 10, there will be no electrical interlock to prevent starting of the vehicle since there will also not be any actual engagement of the electrical PTO clutch 145. Thus, the electrical PTO clutch 145 may clear its condition upon shutdown so that startup is permitted without further action relative to the position of the PTO switch 70, and the PTO switch 70 itself will also be returned to the neutral position to facilitate starting of the riding lawn care vehicle 10 so that no engagement signal is provided from the PTO switch 70 based on the prior engagement position of the PTO switch 70 as the last input provided thereto prior to shutdown of the riding lawn care vehicle 10. Thus, the condition of both the electrical PTO clutch 145 and the PTO switch 70 can be cleared at shutdown and reset to permit startup of the riding lawn care vehicle 10 without any interlock associated with the last or current position of the PTO switch 70 or electrical engagement clutch 145 preventing such startup.

In an example embodiment, the fact that the PTO switch 70 returns to the neutral position after actuation thereof by the user may also mean that additional operational sequences may be inserted via the PTO switch 70, so that other control functions may be provided using the PTO switch 70 without manually repositioning of the PTO switch 70 between the entry of the operational sequences. In this regard, for example, multiple operations of the PTO switch 70 (i.e., initiation of multiple sequential contacts between the contact plate 120 and the disengagement contact 150 or the engagement contact 152) may be inserted without manual repositioning of the PTO switch in between the sequential contacts.

As an example, in some embodiments, the processing circuitry 140 may also provide control signals to a reverse switch 160. The reverse switch 160 may be activated in order to enable the riding lawn care vehicle 10 to mow (or turn the blades in the cutting deck 40) while the vehicle is operated in reverse. Some mowers may have interlocks preventing operation of the mower in reverse without the user specifically providing an input to permit mowing in reverse. The permission to mow in reverse may, like the typical convention PTO clutch, remain activated even after a shutdown. Thus, a mow in reverse switch left in an activated position at shutdown may prevent startup of the mower.

In some embodiments, engagement of the electrical PTO clutch 145 may be accomplished during driving in reverse via operation of the PTO switch 70 twice in the upward direction within a predetermined period of time. Thus, for example, if the processing circuitry 140 receives two engagement signals within a certain period of time (e.g., receipt of a second engagement signal within the space of less than two seconds from receipt of a first engagement signal), the sequence of engagement signals may be interpreted as a mow in reverse instruction. The processing circuitry 140 may therefore shift a mode of the riding lawn care vehicle 10 by providing appropriate control signals to enable the electrical PTO clutch 145 to be engaged while the riding lawn care vehicle 10 is operated in reverse. However, similar to the cases described above in which prior conditions are cleared at shutdown, the PTO switch 70 returns to the neutral position automatically after each manual activation. Thus, the PTO switch 70 will be in the neutral position after any shift is made to enable mowing in reverse. Furthermore, the processing circuitry 140 may clear any mow in reverse signaling if a shutdown occurs. Thus, upon startup of the riding lawn care vehicle 10 after a shutdown, neither the current position of the PTO switch 70 nor any remaining indications of the prior operational enablement signaling provided by the processing circuitry 140 may be retained to inhibit operation of the riding lawn care vehicle 10 relative to startup.

Figure 3:
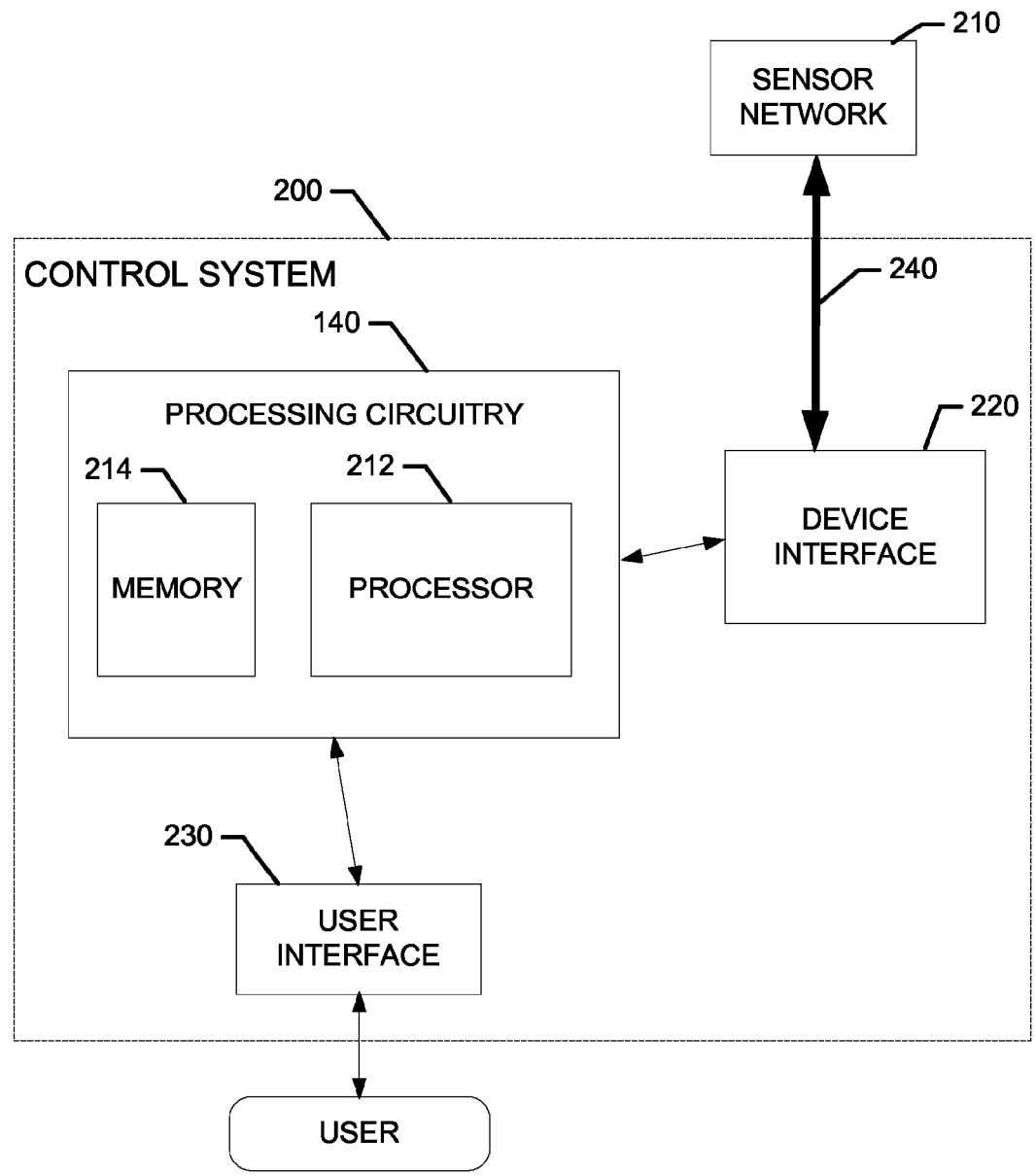
FIG. 3 illustrates a functional block diagram of processing circuitry of an example embodiment.

FIG. 3 illustrates a functional block diagram of the processing circuitry 140 of an example embodiment. In this regard, for example, the processing circuitry 140 may be provided in the context of a control system 200 of the riding lawn care vehicle 10. The control system 200 may utilize the processing circuitry 140 to provide electronic control inputs to one or more functional units of the riding lawn care vehicle 10 and to process data generated by sensors of a sensor network 210 regarding various operational parameters relating to the riding lawn care vehicle 10. The processing circuitry 140 may be configured to perform data processing, control function execution and/or other processing and management services according to an example embodiment of the present invention. In some embodiments, the processing circuitry 140 may be embodied as a chip or chip set. In other words, the processing circuitry 140 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 140 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 140 may include one or more instances of a processor 212 and memory 214 that may be in communication with or otherwise control a device interface 220 and, in some cases, a user interface 230. As such, the processing circuitry 140 may be embodied as a circuit chip (e.g., an integrated circuit chip) configured (e.g., with hardware, software or a combination of hardware and software) to perform operations described herein. However, in some embodiments, the processing circuitry 140 may be embodied as a portion of an on-board computer. In some embodiments, the processing circuitry 140 may communicate with electronic components and/or sensors (e.g., of the sensor network 210) of the riding lawn care vehicle 10 via a single data bus (e.g., data bus 240). As such, the data bus 240 may connect to a plurality or all of the sensors, switching components and/or other electrically controlled components of the riding lawn care vehicle 10 to the processing circuitry 140.

The user interface 230 (if implemented) may be in communication with the processing circuitry 140 to receive an indication of a user input at the user interface 230 and/or to provide an audible, visual, mechanical or other output to the user. As such, the user interface 230 may include, for example, a display, one or more levers, switches, buttons or keys (e.g., function buttons), and/or other input/output mechanisms. In an example embodiment, the PTO switch 70 may be one example of a component that may form a part of the user interface 230.

The device interface 220 may include one or more interface mechanisms for enabling communication with other devices (e.g., sensors of the sensor network 210 and/or other accessories or functional units such as motors, engines, servos, switches or other operational control devices for providing control functions). In some cases, the device interface 220 may be any means such as a device or circuitry embodied in either hardware, or a combination of hardware and software that is configured to receive and/or transmit data from/to sensors in communication with the processing circuitry 140 via the data bus 240. Thus, for example, the device interface 220 may provide interfaces for communication of components of the riding lawn care vehicle 10 via the data bus 240.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 140) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 140) may be embodied as, include or otherwise control the operation of the electrical PTO clutch 145 based on inputs received by the processing circuitry 140 responsive to positioning of the PTO switch 70. As such, in some embodiments, the processor 212 (or the processing circuitry 140) may be said to cause each of the operations described in connection with the PTO switch 70 in relation to operation of the electrical PTO clutch 145 by directing the electrical PTO clutch 145 to undertake the corresponding functionalities responsive to execution of instructions or algorithms configuring the processor 212 (or processing circuitry 140) accordingly.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 140 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from the sensor network 210. Among the contents of the memory 214, applications may be stored for execution by the processor 212 in order to carry out the functionality associated with each respective application. In some cases, the applications may include instructions for recognition of various input signals related to PTO switch 70 positioning and, if necessary, timing associated with the reception of such signals. The applications may further include instructions for operational control of the electrical PTO clutch 145 or the reverse switch 160 as described above.

In an example embodiment, a method of enabling controlling operation of a lawn care device having a cutting deck that houses at least one blade and an engine configured to selectively provide for rotation of the at least one blade responsive to selective coupling of rotary power of the engine to the at least one blade via a power takeoff (PTO) clutch may be provided. FIG. 4 illustrates a block diagram of such a method. The method may include providing a PTO switch that is operable in two directions to engage or disengage the PTO clutch based on which one of the two directions the PTO switch is moved by a user at operation 300. The PTO switch may be biased to return to a neutral position after each operation thereof. The method may further include providing a processor configured to receive inputs indicative of movement of the PTO switch in either of the two directions at operation 310, utilizing the processor to provide control of the PTO clutch based on the movement of the PTO switch at operation 320, and utilizing the processor to control performance of at least one additional operational function responsive to sequential operation of the PTO switch in at least one of the two directions at operation 330.

In some cases, utilizing the processor to control performance of at least one additional operational function may include utilizing the processor to control enablement for rotation of the at least one blade while the lawn care device is operated in a reverse direction. In some embodiments, the method may include additional, optional operations. An example of a potential optional operation that may be included in the method is shown in dashed lines in FIG. 4. In this regard, for example, the method may further include utilizing the processor to light an indicator light to inform the user that mowing in reverse is enabled at operation 340.

Thus, example embodiments provide a two-way, momentary PTO switch that reduces the likelihood of various interlocks from interfering with the user experience, while at the same time resetting prior entries after shutdown so that proper startup conditions are provided each time after a shutdown without additional operator intervention. The operator experience may therefore be improved while still providing for effective control over various functions of the riding lawn care vehicle on which the PTO switch is employed.

In an example embodiment, a lawn care device is provided. The lawn care device may include a cutting deck housing at least one blade, an engine configured to selectively provide for rotation of the at least one blade responsive to selective coupling of the rotary power of the engine to the at least one blade via a PTO clutch, and a PTO switch that is operable in two directions to engage or disengage the PTO clutch based on which one of the two directions the PTO switch is moved by a user. In an example embodiment, the PTO switch may be biased to return to a neutral position after each operation thereof. Moreover, in some cases, the PTO switch may be configured to perform at least one additional operational function responsive to sequential operation of the PTO switch in at least one of the two directions. In some cases, the movement of the PTO switch may be determined based on electrical contact being made between a portion of the PTO switch (e.g., a contact plate) and electrical contacts associated with switching circuitry of the lawn care device (e.g., an engagement contact and a disengagement contact).

The lawn care device of some embodiments may include additional features that may be optionally added. For example, in some embodiments, (1) the PTO switch may include a spring configured to return the PTO switch to the neutral position responsive to a release of the PTO switch by the user after movement of the PTO switch in either of the two directions. Additionally or alternatively, (2) the at least one additional operational function may include enablement for rotation of the at least one blade while the lawn care device is operated in a reverse direction. In some cases, (3) the at least one additional operational function may be initiated responsive to movement of the PTO switch at least a predetermined number of times (e.g., two) in the same direction within a given period of time (e.g., about one second). Additionally or alternatively, (4) the at least one additional operational function is initiated responsive to sequential operation of the PTO switch comprising movement of the PTO switch at least two successive times in a direction corresponding with engagement of the PTO clutch.

In some embodiments, any or all of (1) to (4) may be employed, and the PTO switch may include a shaft that extends at least in part into an operation panel of the lawn care device. Additionally or alternatively, the PTO switch may include a cap disposed at a distal end of the shaft relative to the operation panel. In some embodiments, any or all of (1) to (4) may be employed, and the cap may include at least one light element disposed therein. Additionally or alternatively, the light element may be configured to be lit responsive to enablement for rotation of the at least one blade while the lawn care device is operated in the reverse direction. In some embodiments, any or all of (1) to (4) may be employed, and the PTO switch may be configured to provide an input to processing circuitry indicative of a direction of movement of the PTO switch. The processing circuitry may be configured to control operation of the PTO clutch based on inputs provided by the PTO switch. Additionally or alternatively, the processing circuitry may receive information indicative of operational characteristics of the lawn care device via a data bus, and provide instructions to the PTO clutch and a reverse switch via the data bus.

In some embodiments, the processing circuitry 140 (which may include a processor capable of executing instructions stored in a non-transitory computer readable medium/memory) may be configured to implement a control algorithm for starting of the riding lawn care vehicle 10. Given that the control algorithm is practiced in connection with operation of the processing circuitry 140, the default position for the PTO switch 70 is essentially a neutral position so that the PTO switch 70 may effectively be removed from the start sequence of the riding lawn care vehicle 10. Accordingly, the operator is not required to remember a position of the PTO switch 70 or to place the PTO switch 70 in a particular position prior to starting of the riding lawn care vehicle 10. As such, for example, the operator does not need to shut the PTO switch 70 off and then back on again, as would be required in a conventional system.

FIG. 5 illustrates an example of a control algorithm according to an example embodiment. It should be appreciated that the control algorithm may be executed by a processor or processing circuitry. Thus, for example, the operations described herein may be executed by processing circuitry 140. The processing circuitry 140 may initially receive an input to start the engine at operation 400. At operation 402, the processing circuitry 140 may reference internal memory (e.g., memory 214) to set or confirm that the PTO state is off and mow-in-reverse (MIR) state is also off. The PTO switch state may also initially be set to off since the PTO switch 70 automatically returns physically to a neutral position as described above. A determination may then be made, at operation 404, as to whether the parking brake is engaged or whether another brake is engaged by an operator in the seat of the riding lawn care vehicle 10. In other words, a check of safety interlock satisfaction may be accomplished prior to starting. However, PTO engagement need not be one of the interlocks checked since the PTO is removed from the check by example embodiments. If there is no brake applied, then an output error indicator may be generated at operation 406 and the program may cycle back to operation 400. If the brake is applied, engine start may be commenced at operation 408, but the PTO may remain unengaged.

Thereafter, the control circuitry 140 may monitor for receipt of an input to turn off the engine at operation 410. If an input to turn the engine off is received, the PTO may be disengaged (if engaged) at operation 412. At operation 414, the processing circuitry 140 may reference internal memory to set or confirm that the PTO state is off, that the mow-in-reverse (MIR) state is also off and that the PTO switch state is off. The engine may be stopped at operation 416 and flow may return to operation 400.

If, at operation 410, there is no input for engine turn off, a determination may be made at operation 418 as to whether an input to engage the PTO is received (e.g., by the operator pulling the PTO switch 70 upward). If no such input is received, an output error indicator may be triggered at operation 420. Meanwhile, if the input is received, a determination may be made at operation 422 as to whether the operator is in the seat. If the operator is not in the seat, an output error indicator may be triggered at operation 420. However, if the operator is in the seat, then a further determination may be made at operation 424 as to whether the vehicle is in reverse. If the vehicle is in reverse, an output error indicator may be triggered at operation 420. However, if the vehicle is not in reverse, the processing circuitry 140 may reference internal memory to set or confirm that the PTO state is on, that the mow-in-reverse (MIR) state is off and that the PTO switch state is in indicative of a PTO on, MIR off state at operation 426. The electric clutch may then be actuated to engage the PTO system at operation 428.

Referring now to FIG. 5B, if a determination regarding whether the operator leaves the seat at operation 430 indicates that the operator has left the seat, a further determination may be made at operation 432 as to whether the brake is engaged. If the brake is not engaged, flow may return to operation 412 above. However, if the brake is engaged, the PTO may be disengaged while keeping the engine running at operation 434. The processing circuitry 140 may then reference internal memory to set or confirm that the PTO state is off, that the mow-in-reverse (MIR) state is off and that the PTO switch state is off at operation 436. The PTO switch itself may again be automatically returned to the neutral position. Flow may then return to operation 420. Meanwhile, if the operator remains in the seat at operation 430, a determination may be made as to whether the vehicle has been put in reverse at operation 438. If the vehicle has been put in reverse, then operation returns to operation 434. However, if the vehicle has not been put in reverse, a determination may be made as to whether an input is received to turn on MIR (e.g., via the operator pulling upward on the PTO switch while the PTO is engaged) at operation 440.

If the MRI input is received, the MIR indicator light may be turned on at operation 442. Thereafter, the PTO may be engaged to stay engaged while the vehicle is moved in reverse and the MIR state may be stored in the memory as the on state at operation 444. The processing circuitry 140 may reference internal memory to set or confirm that the PTO state is on, that the mow-in-reverse (MIR) state is on and that the PTO switch state is in indicative of a PTO on, MIR on state at operation 446. In some embodiments, flow after operation 446 may return to connection point D on FIG. 5C. However, in some optional cases (an example of which is illustrated in dashed lines in FIG. 2B), a determination may be made at operation 448 as to whether the vehicle is shifted back to forward operation. If a shift to forward operation is made, the processing circuitry 140 may reference internal memory to set or confirm that the PTO state is on, that the mow-in-reverse (MIR) state is off and that the PTO switch state is in indicative of a PTO on, MIR off state at operation 450. The MIR indicator light may then be turned off at operation 452 and flow may proceed to connection point C of FIG. 5C. Returning to operation 440, if no input is received to turn MIR on as a result of the determination of operation 440, flow may proceed to connection point C of FIG. 5C. Meanwhile, if the vehicle has not been shifted back to forward operation at operation 448, then flow may proceed to making a determination as to whether an input is received to turn off MIR (by the operator pulling upward on the PTO switch while MIR is on) at operation 454. If the input to turn MIR off is not received, flow may proceed to connection point C of FIG. 5C. However, if the input is received to turn MIR off at operation 454, the processing circuitry 140 may reference internal memory to set or confirm that the PTO state is on, that the mow-in-reverse (MIR) state is off and that the PTO switch state is in indicative of a PTO on, MIR off state at operation 456. The MIR light may then be turned off at operation 458 and flow may proceed to connection point C of FIG. 5C at which time a determination may be made as to whether an input is received to turn off PTO (e.g., by the operator pushing the PTO switch 70 downward) at operation 460. If the input to turn PTO off is received, PTO may be disengaged, but the engine may be kept running at operation 462. The processing circuitry 140 may reference internal memory to set or confirm that the PTO state is off, that the mow-in-reverse (MIR) state is off and that the PTO switch state is off state at operation 464.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn care device comprising:
   a cutting deck housing at least one blade;
   an engine configured to selectively provide for rotation of the at least one blade responsive to selective coupling of the rotary power of the engine to the at least one blade via a power takeoff (PTO) clutch; and a PTO switch that is operable in two directions to engage or disengage the PTO clutch based on which one of the two directions the PTO switch is moved by a user, wherein the PTO switch is biased to return to a neutral position after each operation thereof, and wherein the PTO switch is configured to perform at least one additional operational function responsive to sequential operation of the PTO switch in at least one of the two directions.

2. The lawn care device of claim 1, wherein the PTO switch comprises a spring configured to return the PTO switch to the neutral position responsive to a release of the PTO switch by the user after movement of the PTO switch in either of the two directions.

3. The lawn care device of claim 1, wherein the at least one additional operational function comprises enablement for rotation of the at least one blade while the lawn care device is operated in a reverse direction.

4. The lawn care device of claim 3, wherein the at least one additional operational function is initiated responsive to movement of the PTO switch at least a predetermined number of times in the same direction within a given period of time.

5. The lawn care device of claim 4, wherein the at least one additional operational function is initiated responsive to sequential operation of the PTO switch comprising movement of the PTO switch at least two successive times in a direction corresponding with engagement of the PTO clutch.

6. The lawn care device of claim 4, wherein the at least one additional operational function is initiated responsive to movement of the PTO switch at least two times in the same direction within about one second.

7. The lawn care device of claim 3, wherein the PTO switch comprises a shaft that extends at least in part into an operation panel of the lawn care device, and a cap disposed at a distal end of the shaft relative to the operation panel, wherein the cap comprises at least one light element disposed therein, and wherein the light element is configured to be lit responsive to enablement for rotation of the at least one blade while the lawn care device is operated in the reverse direction.

8. The lawn care device of claim 1, wherein the PTO switch comprises a shaft that extends at least in part into an operation panel of the lawn care device.

9. The lawn care device of claim 1, wherein the PTO switch comprises a shaft that extends at least in part into an operation panel of the lawn care device, and a cap disposed at a distal end of the shaft relative to the operation panel.

10. The lawn care device of claim 1, wherein the PTO switch comprises a shaft that extends at least in part into an operation panel of the lawn care device, and a cap disposed at a distal end of the shaft relative to the operation panel, and wherein the cap comprises at least one light element disposed therein.

11. The lawn care device of claim 1, wherein the PTO switch is configured to provide an input to processing circuitry indicative of a direction of movement of the PTO switch, and wherein the processing circuitry is configured to control operation of the PTO clutch based on inputs provided by the PTO switch.

12. The lawn care device of claim 1, wherein the PTO switch is configured to provide an input to processing circuitry indicative of a direction of movement of the PTO switch, wherein the processing circuitry is configured to control operation of the PTO clutch based on inputs provided by the PTO switch, wherein the processing circuitry receives information indicative of operational characteristics of the lawn care device via a data bus, and wherein the processing circuitry provides instructions to the PTO clutch and a reverse switch via the data bus.

13. The lawn care device of claim 1, wherein the lawn care device is a riding lawn mower.

14. A power takeoff (PTO) switch for controlling selective coupling of rotary power from an engine of a lawn care device to a cutting blade of the lawn care device via a PTO clutch, the PTO switch comprising:

a cap portion graspable by a user of the lawn care vehicle;

a shaft having the cap portion disposed proximate to one end thereof and extending into the lawn care device, the shaft being operable in two directions; and a contact plate disposed proximate to an opposite end of the shaft to make electrical contact with one of at least two contacts responsive to movement of the shaft, the at least two contacts corresponding to an engagement contact and a disengagement contact, wherein electrical contact between the contact plate and the engagement contact engages the PTO clutch and electrical contact between the contact plate and the disengagement contact disengages the PTO clutch, wherein the shaft is biased to return to a neutral position after each operation of the PTO switch, and wherein sequential electrical contacts between the engagement contact and the contact plate causes at least one additional operational function of the lawn care device to be performed.

15. The PTO switch of claim 14, further comprising a spring configured to return the shaft to the neutral position responsive to a release of the cap by the user after movement of the shaft in either of the two directions.

16. The PTO switch of claim 14, wherein the at least one additional operational function comprises enablement for rotation of the cutting blade while the lawn care device is operated in a reverse direction.

17. The PTO switch of claim 16, wherein the at least one additional operational function is initiated responsive to movement of the shaft at least a predetermined number of times in the same direction within a given period of time.

18. A lawn care vehicle comprising:

an engine;

a power-takeoff (PTO) system configured to transmit power from the engine to an implement to drive a moveable device of the implement;

an electric clutch system configured to selectively engage and disengage the PTO system;

a PTO switch that is operable in two directions and is biased to return to a neutral position after each operation thereof;

processing circuitry configured to control the PTO system and record, in a memory, a recorded state of the PTO switch, the processing circuitry communicably coupled to the electric clutch system, the PTO switch, and the memory, wherein a response of the processing circuitry to operation of the PTO switch depends at least in part on the recorded state of the PTO switch, and wherein the processor is configured to confirm or change the recorded state of the PTO switch upon the occurrence of each of the following events: the PTO switch being actuated, the engine being shutdown or started, or the PTO being disengaged.

19. The lawn care vehicle of claim 18, wherein the processing circuitry is configured to store in memory a recorded state of the PTO switch that communicates that the PTO switch is in an off position corresponding to the PTO being disengaged;
   wherein the processing circuitry is configured to store in memory a recorded state of the PTO switch that communicates that the PTO switch is in an on position corresponding to the PTO being engaged; and
   wherein the processing circuitry is configured to change the recorded state of the PTO switch in the memory from an on state to an off state responsive to the engine being restarted.

20. The lawn care vehicle of claim 18, wherein the processing circuitry is configured to change the recorded state of the PTO switch automatically to an off state responsive to a plurality of operational state changes of the lawn care vehicle without reliance on a physical position change in the PTO switch.

\* \* \* \* \*